United States Patent
Wang et al.

(10) Patent No.: US 9,573,551 B1
(45) Date of Patent: Feb. 21, 2017

(54) SIDE AIRBAG CUSHION AND METHOD OF MANUFACTURE

(71) Applicants: Xiaohong Wang, Famington, UT (US); Takayuki Makioka, Roy, UT (US); Hongseok Kim, Ogden, UT (US); Atsushi Yamada, Ushiku (JP)

(72) Inventors: Xiaohong Wang, Famington, UT (US); Takayuki Makioka, Roy, UT (US); Hongseok Kim, Ogden, UT (US); Atsushi Yamada, Ushiku (JP)

(73) Assignee: Autoliv ASP, Inc., Ogden, UT (US)

(*) Notice: Subject to any disclaimer, the term of this patent is extended or adjusted under 35 U.S.C. 154(b) by 0 days.

(21) Appl. No.: 14/934,613

(22) Filed: Nov. 6, 2015

(51) Int. Cl.
B60R 21/231 (2011.01)
B60R 21/2338 (2011.01)

(52) U.S. Cl.
CPC ..... *B60R 21/23138* (2013.01); *B60R 21/2338* (2013.01); *B60R 2021/23123* (2013.01); *B60R 2021/23382* (2013.01)

(58) Field of Classification Search
CPC ............... B60R 21/23138; B60R 2021/23123; B60R 2021/23146; B60R 2021/23324; B60R 2021/23566
See application file for complete search history.

(56) References Cited

U.S. PATENT DOCUMENTS

| | | | |
|---|---|---|---|
| 6,270,113 B1* | 8/2001 | Wipasuramonton | B60R 21/23138 280/728.1 |
| 6,279,944 B1* | 8/2001 | Wipasuramonton | B60R 21/23138 280/729 |
| 8,622,422 B1* | 1/2014 | Thomas | B60R 21/231 280/730.2 |
| 8,757,657 B1* | 6/2014 | Hotta | B60R 21/233 280/730.2 |
| 8,915,519 B2 | 12/2014 | Hotta et al. | |
| 2005/0218635 A1* | 10/2005 | Wipasuramonton | B60R 21/23138 280/730.2 |
| 2005/0248132 A1* | 11/2005 | Wheelwright | B60R 21/23138 280/729 |
| 2006/0001244 A1* | 1/2006 | Taguchi | B60R 21/23138 280/729 |
| 2006/0175809 A1* | 8/2006 | Yamaji | B60R 21/23138 280/729 |

(Continued)

FOREIGN PATENT DOCUMENTS

| EP | 2 8562 752 A1 | 4/2015 |
|---|---|---|
| EP | 2 876 003 A1 | 5/2015 |

(Continued)

*Primary Examiner* — Barry Gooden, Jr.
(74) *Attorney, Agent, or Firm* — Pauley Erickson & Kottis

(57) ABSTRACT

An airbag cushion having a main airbag cushion panel that includes a pair of major body fabric portions continuously formed together with a pair of inner valve fabric portions extending therebetween. The pair of inner valve fabric portions are foldable to form an inner valve for at least in part containing an inflation gas supplying inflator device. The pair of major body fabric portions are joinable together at a peripheral joint portion to at least in part form an airbag cushion body. The airbag cushion body has or forms an interior to receive inflation gas and is deployable on a side of an occupant seated in a vehicle seat. Also provided are corresponding or associated methods of or for manufacturing a side airbag cushion.

19 Claims, 13 Drawing Sheets

(56) References Cited

U.S. PATENT DOCUMENTS

| | | | | |
|---|---|---|---|---|
| 2007/0228699 A1* | 10/2007 | Bederka | B60R 21/207 | 280/730.2 |
| 2007/0228701 A1* | 10/2007 | Yamamura | B60R 21/23138 | 280/730.2 |
| 2008/0088118 A1* | 4/2008 | Wipasuramonton | B60R 21/23138 | 280/728.2 |
| 2012/0187729 A1* | 7/2012 | Fukawatase | B60R 21/207 | 297/216.1 |
| 2012/0248747 A1* | 10/2012 | Sugimoto | B60R 21/207 | 280/729 |
| 2014/0159355 A1* | 6/2014 | Fujiwara | B60R 21/23138 | 280/730.2 |
| 2014/0208567 A1* | 7/2014 | Hotta | B60R 21/2346 | 29/428 |
| 2014/0210192 A1* | 7/2014 | Hotta | B60R 21/23138 | 280/730.2 |
| 2015/0097359 A1 | 4/2015 | Rickenbach et al. | | |
| 2015/0115583 A1* | 4/2015 | Azuma | B60R 21/231 | 280/740 |
| 2015/0130169 A1 | 5/2015 | Fujita et al. | | |
| 2015/0166003 A1* | 6/2015 | Fujiwara | B60R 21/207 | 280/730.2 |
| 2015/0367804 A1* | 12/2015 | Fujiwara | B60R 21/23138 | 280/730.2 |

FOREIGN PATENT DOCUMENTS

| | | |
|---|---|---|
| JP | 2015-20652 | 2/2015 |
| JP | 2015-74362 A | 4/2015 |

\* cited by examiner

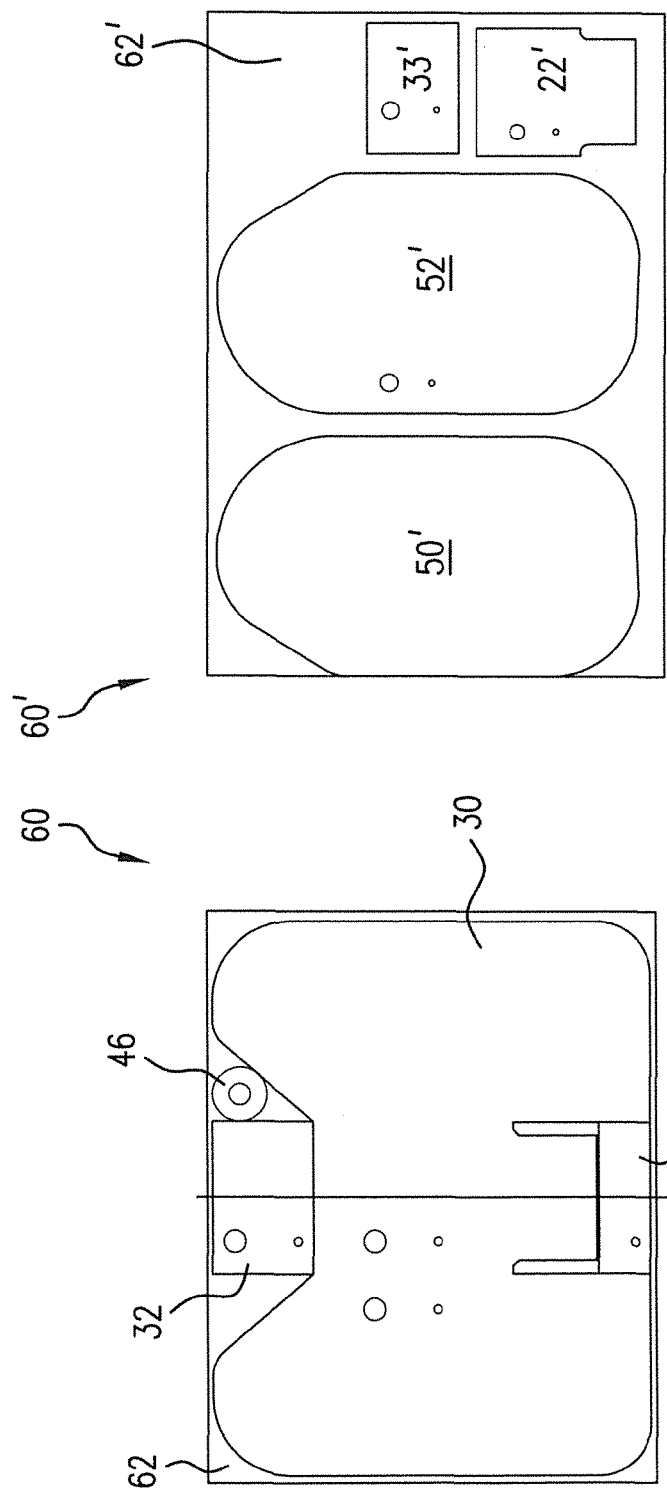

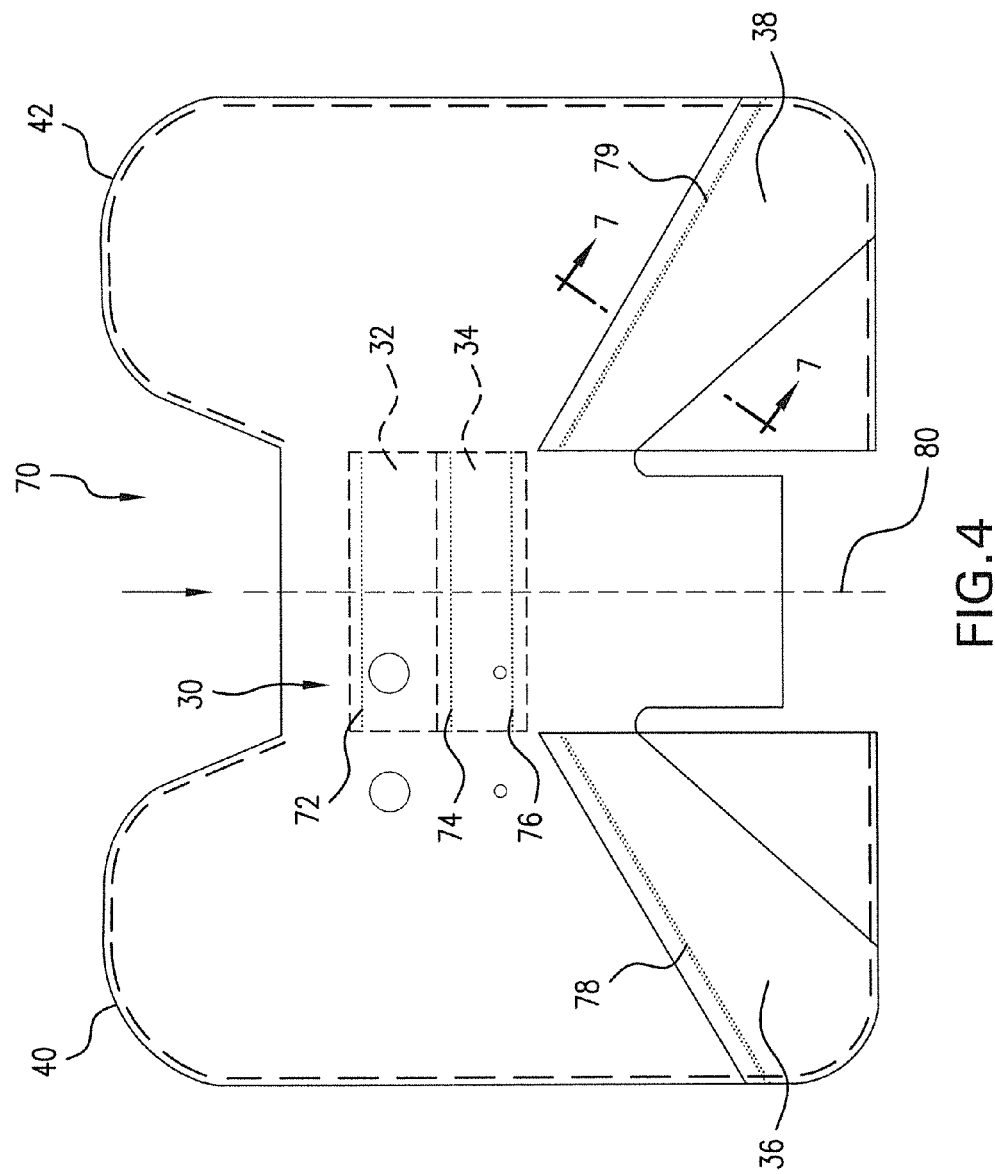

SIDE AIRBAG CUSHION AND METHOD OF MANUFACTURE

BACKGROUND OF THE INVENTION

Field of the Invention

This invention relates generally to inflatable vehicular safety restraints such as airbag installations for automotive vehicles and, more particularly, to inflatable vehicular safety restraint assemblies such as particularly suited in or for the protection of a seated vehicle occupant in the event of the occurrence of a side impact or collision.

Discussion of Related Art

The use of side airbag cushions is widespread in present day automotive technology. Typically, a side airbag cushion is stored or located in an inner side structure or in a backrest of a seat of a vehicle and, in the event of an impact or collision helps to protect an occupant, especially the thorax of an occupant, during a side impact or collision.

In at least selected applications, it may be desirable to incorporate a feature or features that desirably facilitates direction of inflation gas from an inflator or other inflation gas supplying device into an airbag cushion to effect the desired inflation of the airbag cushion. Further, it is known to incorporate or include one or more tethers within an airbag cushion such as to more specifically control or direct deployment of the airbag cushion. As will be appreciated, the inclusion of such features can desirably improve either or both side airbag cushion operation and performance.

Thus, with the more widespread usage and incorporation of side airbag cushions there is a growing need and demand for improved side airbag cushion designs and manufacture such as can desirably achieve one or more of improved utilization of materials such as improved utilization of fabric materials commonly utilized in airbag cushion manufacture and/or improved manufacture or production such as by simplifying the manufacturing process and/or facilitating the incorporation of features such for improved inflation gas flow control and airbag cushion deployment control.

SUMMARY OF THE INVENTION

A general object of the invention is to provide at least one of:

an improved side airbag cushion and an improved method of manufacturing a side airbag cushion.

A more specific objective of the invention is to overcome one or more of the problems described above.

In one aspect of the invention there is provided an improved airbag cushion. In one embodiment, such an airbag cushion includes or is formed by a main airbag cushion panel having a pair of major body fabric portions continuously formed together with a pair of inner valve fabric portions extending therebetween. The pair of inner valve fabric portions are foldable to form an inner valve for at least in part containing an inflation gas supplying inflator device. The pair of major body fabric portions are joinable together at a peripheral joint portion to at least in part form an airbag cushion body. The airbag cushion body has or includes an interior to receive inflation gas. The airbag cushion body is deployable on a side of an occupant seated in a vehicle seat.

In another aspect of the invention, there is provided a side airbag cushion. Such a side airbag cushion has a main airbag cushion panel including a pair of major body fabric portions continuously formed together with a pair of inner valve fabric portions extending therebetween. The pair of inner valve fabric portions are foldable to form an inner valve for at least in part containing an inflation gas supplying inflator device. The pair of major body fabric portions are joinable together at a peripheral joint portion to at least in part form an airbag cushion body. The airbag cushion body has an interior to receive inflation gas. The inner valve at least in part serves to guide the inflation gas into the airbag cushion body interior, with the airbag cushion body deployable on a side of an occupant seated in a vehicle seat.

In another aspect of the invention, there is provided a method of manufacturing an airbag cushion. In accordance with one embodiment, one such method involves the cutting of a sheet of airbag cushion fabric to form a main airbag cushion panel that has or includes a pair of major body fabric portions continuously formed together with a pair of inner valve fabric portions extending therebetween.

Other objects and advantages will be apparent to those skilled in the art from the following detailed description taken in conjunction with the appended claims and drawings.

BRIEF DESCRIPTION OF THE DRAWINGS

FIG. 3A is a top view showing a cushion fabric layout cut utilization in accordance with one embodiment of the invention.

FIG. 3B is a top view showing a cushion fabric layout cut utilization in a conventionally designed airbag cushion having an inner valve.

FIG. 4 is a top view of a precursor to the airbag cushion shown in FIG. 1.

DETAILED DESCRIPTION OF THE INVENTION

The present invention provides a new and improved airbag cushion and a method of manufacturing or making such an airbag cushion.

Figure 1:
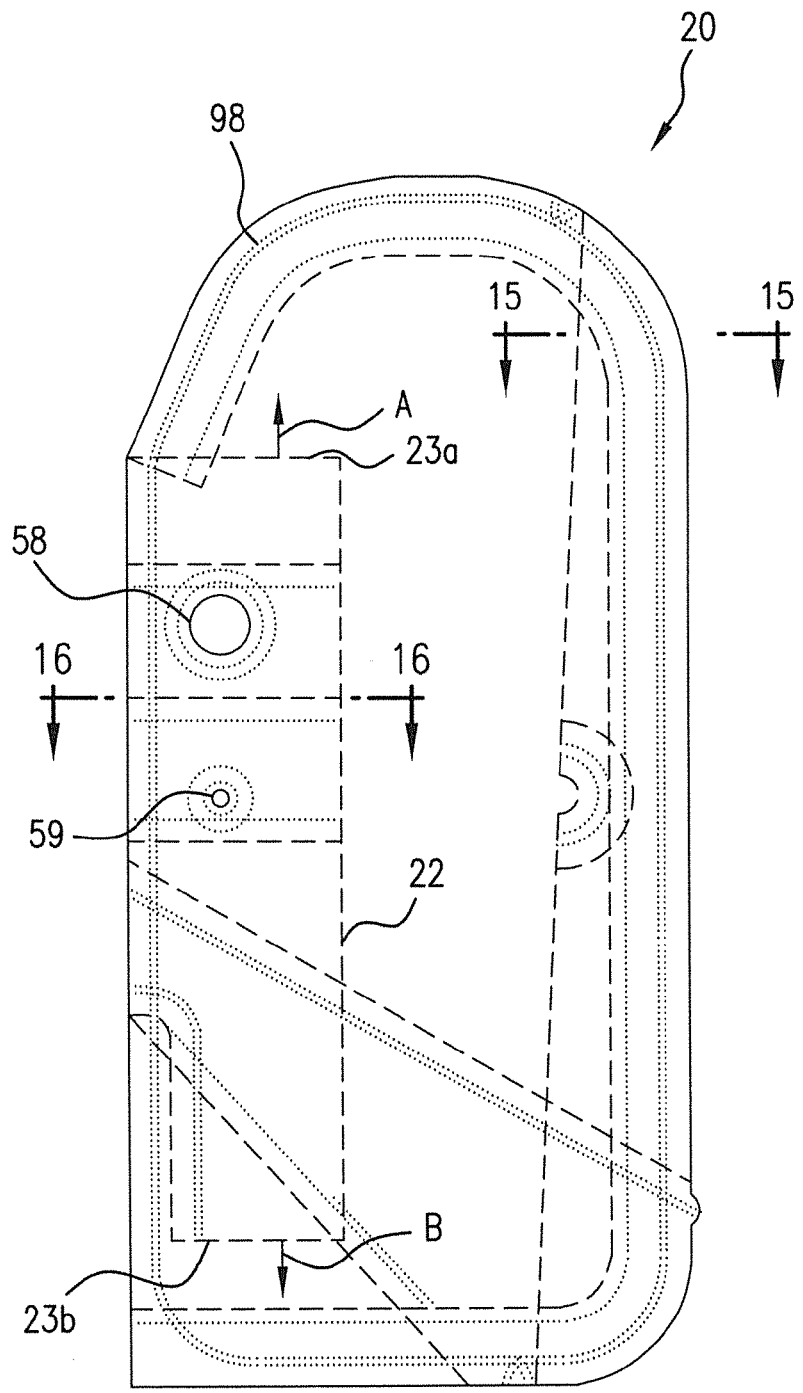
FIG. 1 is top view showing an airbag cushion in accordance with one embodiment of the invention.

First, turning to FIG. 1, there is generally shown an airbag cushion, generally designated by the reference numeral 20, and in accordance with a one embodiment of the invention. While the invention will be described hereinafter with particular reference to a side airbag cushion and associated airbag inflatable restraint system installations, those skilled in the art and guided by the teachings herein provided will understand and appreciate that the broader practice of the invention is not necessarily so limited as the invention can have general applicability to other types or kinds of airbag assemblies including, for example, knee airbags, driver, and passenger front airbags, as may be desired and such as may find application in various restraint assemblies such as for automotive vehicles including vans, pick-up trucks, and particularly automobiles.

The airbag cushion 20 is of a type that has or includes an inner valve or inflation gas guide or channeling feature, such as identified by the reference numeral 22, and such as can desirably serve to guide or direct the flow of inflation gas from an inflator device, (not shown) and such as at least in part held or contained within the cushion 20 and particularly the inner valve 22, within the interior of the airbag cushion such as to produce or result in the desired deployment of the airbag cushion upon the proper actuation of the inflatable restraint system.

In accordance with one aspect of the invention, the valve or guide 22 is desirably made or formed of a fabric material, e.g., a fabric the same or similar to the fabric used in the manufacture or construction of the airbag cushion itself.

More specifically, in the airbag cushion 20 shown in FIG. 1, the inner valve 22 forms a sleeve such as to appropriately extend about an associated inflator device disposed therein. The valve sleeve 22 can desirably include or have oppositely disposed open ends 23a and 23b to permit inflation gas passage out of the interior of the inner valve 22 and into the interior of the airbag cushion body, such as represented by the arrows A and B.

Figure 2:
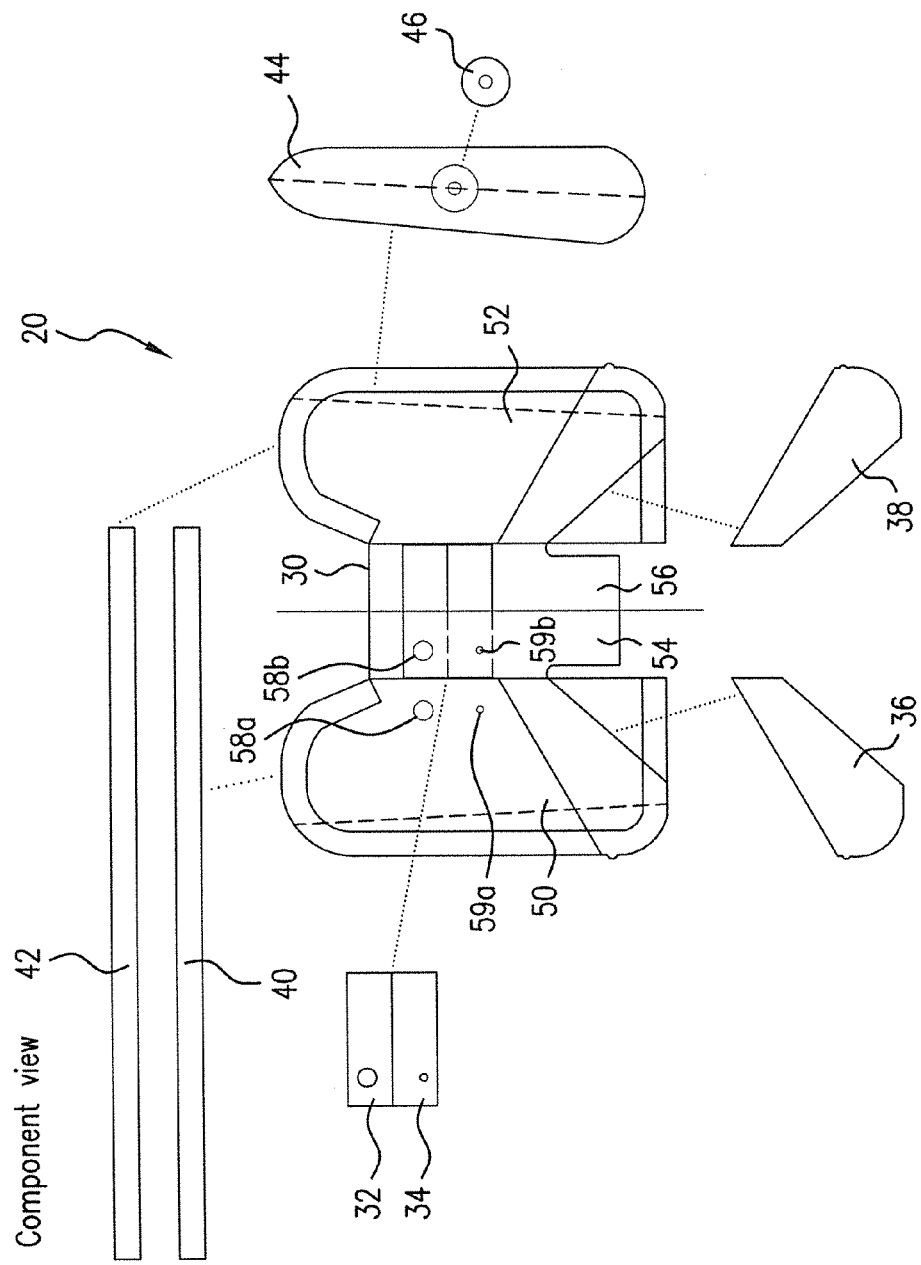
FIG. 2 a partially exploded major component view of the construction of the airbag cushion shown in FIG. 1

Turning to FIG. 2, the major components of the construction of the airbag cushion 20 are shown. These components include: a main panel 30, a first and a second heat shield, 32 and 34, a first and a second internal tether or baffle, 36 and 38, a first and second seam protection section, 40 and 42, a front panel section 44 and a front panel vent patch 46.

As will be described and discussed in greater detail below, the main panel 30 can in accordance with one embodiment serve to form or otherwise incorporate a first and a second side cushion panel 50 and 52 as well as a first and a second side inner valve panel 54 and 56. Thus, in accordance with one preferred embodiment, the main panel 30 desirably continuously forms a pair of major body fabric portions 50 and 52 with a pair of inner valve fabric portions 54 and 56, foldable to form an inner valve 22 for at least in part containing an inflation gas supplying inflator device. For example, the pair of major body fabric portions 50 and 52 are joinable together at a peripheral joint portion to at least in part form an airbag cushion body, the airbag cushion body having an interior to receive inflation gas, the airbag cushion body deployable on a side of an occupant seated in a vehicle seat.

Further, the first side panel 50 and the first side inner valve panel 54 have or include a corresponding first opening 58a and 58b and a corresponding second opening 59a and 59b such as to form the longitudinally spaced apart airbag cushion openings 58 and 59 shown in FIG. 1 and such as for use in conjunction with an associated inflator device.

FIGS. 3A and 3B highlight improved or increased airbag cushion fabric utilization realizable in accordance with one aspect of the invention. More specifically, FIG. 3A shows an airbag cushion fabric cut, generally designated 60, such as employed in the manufacture of the air bag cushion 30 in accordance with one aspect of the invention. FIG. 3B shows an airbag cushion fabric cut, generally designated 60', of a conventionally designed airbag cushion having an inner valve.

As shown, the fabric cut 60 desirably serves to produce or result in the main panel 30, the first and second heat shields 32 and 34, and the front panel vent patch 46 all from within a section of fabric 62 with minimal waste or non-use of fabric. In contrast, the fabric cut 60', produces a first and a second side panel, 50' and 52', an inner valve section 22' and a heat shield 33' with significant portions of the fabric section 62' not directly utilized in the production of the resulting cushion.

Figure 6:
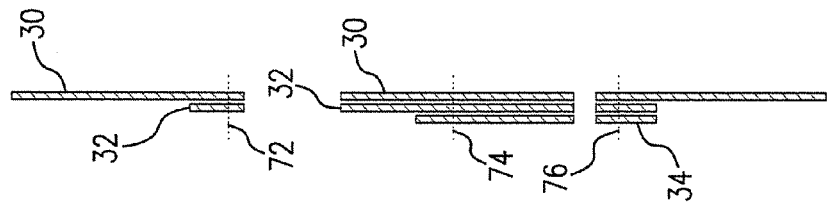
FIG. 6 is a sectional view along the line 6-6 shown in FIG. 5.
Figure 5:
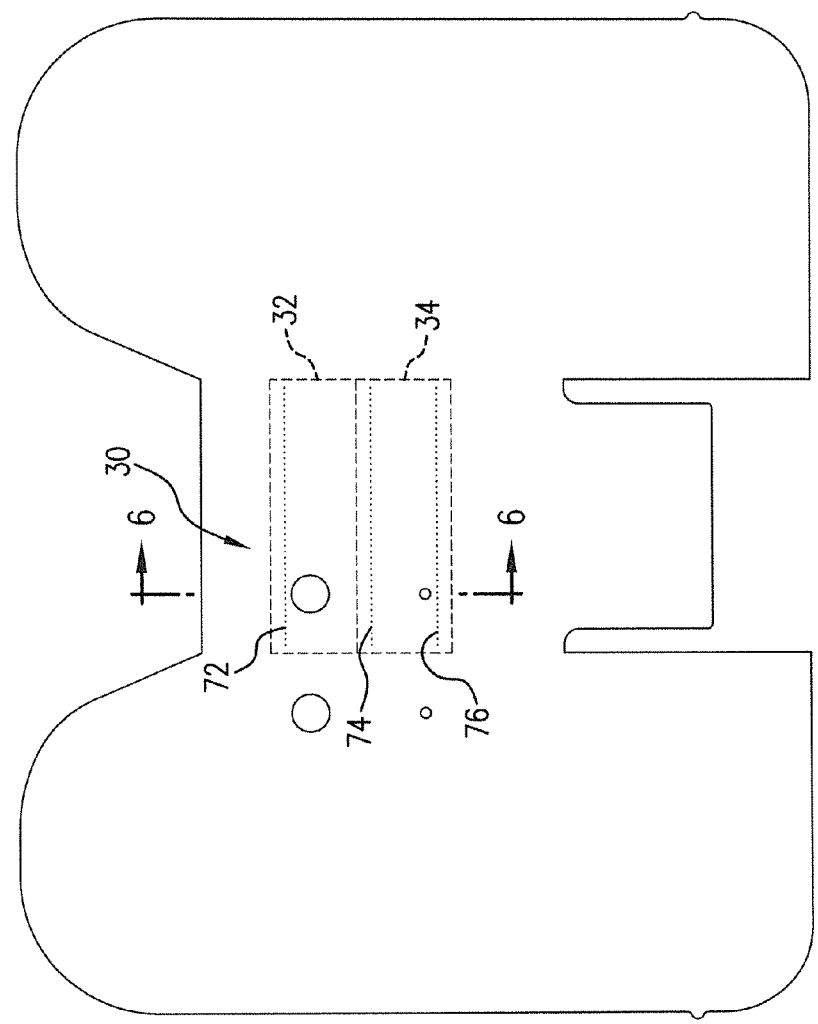
FIG. 5 is a top view of a precursor to the airbag cushion shown in FIG. 1.
Figure 7:
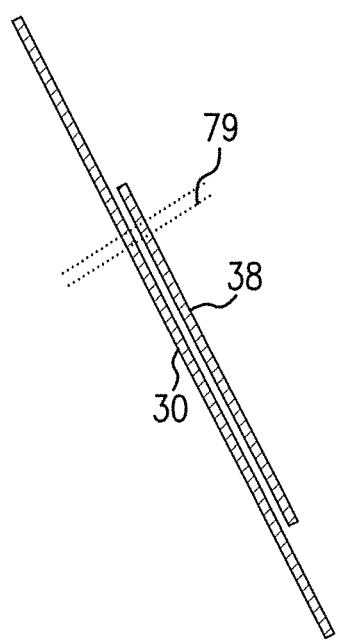
FIG. 7 is a sectional view along the line 7-7 shown in FIG. 4.

FIG. 4 shows a precursor 70 to the airbag cushion 20, with FIGS. 5-7 showing certain specific features of the cushion design.

In the cushion precursor 70, the first heat shield or patch 32 is sewn on the backside of the main panel 30, such as via a seam 72 and a seam 76 such as more specifically shown in FIG. 5. The second heat shield or patch 34 is sewn such as via a seam 74 and a seam 76, such as more specifically shown in FIG. 5, and such as to join together the second heat shield 34, the first heat shield 32 and the main panel 30. The tethers 36 and 38 are sewn on the main panel 30, such as via seams 78 and 79, respectively, and such as more particularly shown in FIG. 7. If desired, optional seam protections 40 and 42, such as known in the art, can be sewn or otherwise appropriately disposed onto the main panel 30 such as around the main panel periphery or where else desired.

Figure 8:
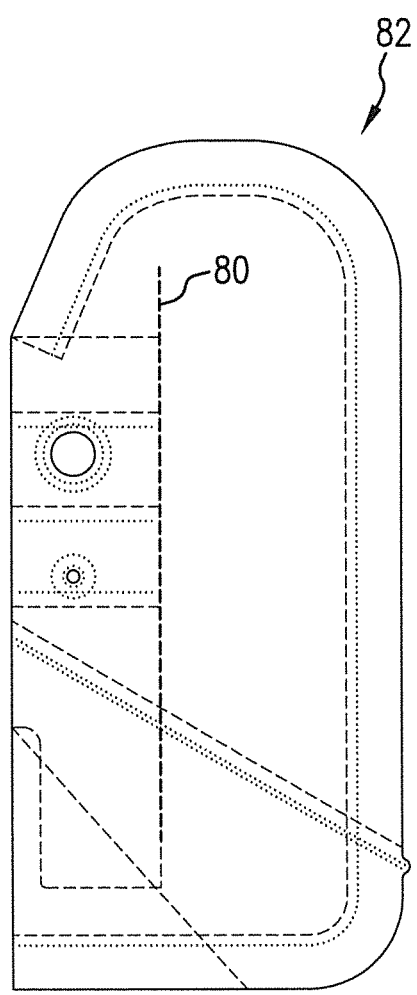
FIG. 8 is a top view showing the airbag cushion precursor shown in FIG. 4 but now in a subsequent folded condition in accordance with one aspect of the invention.

The cushion precursor 70 can then be appropriately folded, e.g., tuck-in folded, along the fold line 80 to form the folded precursor 82 shown in FIG. 8.

Figure 10:
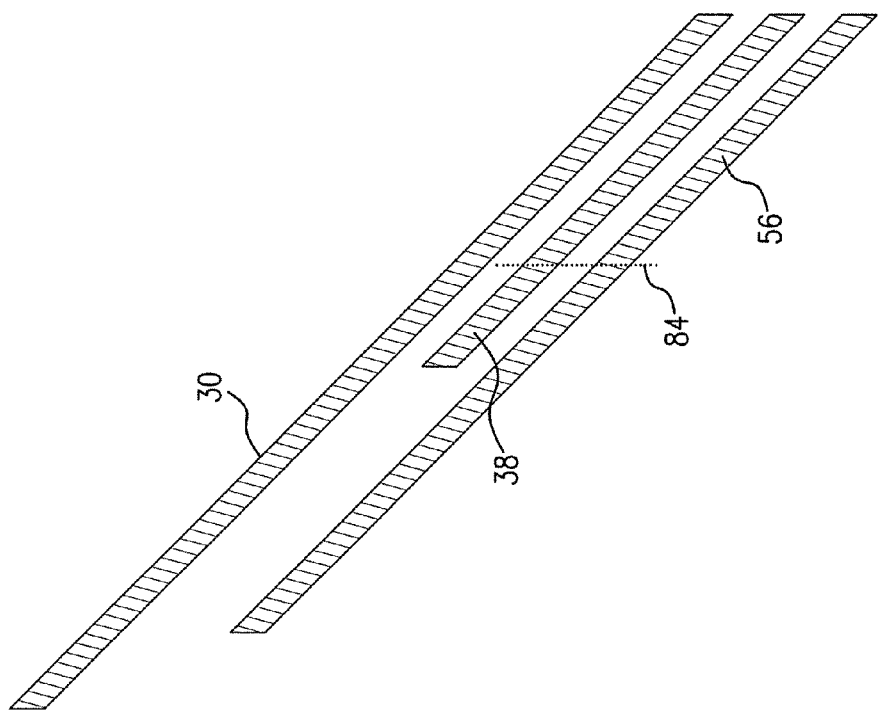
FIG. 10 is a fragmentary cross sectional view, taken along the line 10-10 shown in FIG. 9, showing the sewing together of a layer of the folded valve with the internal tether of an airbag cushion in accordance with one embodiment of the invention.
Figure 9:
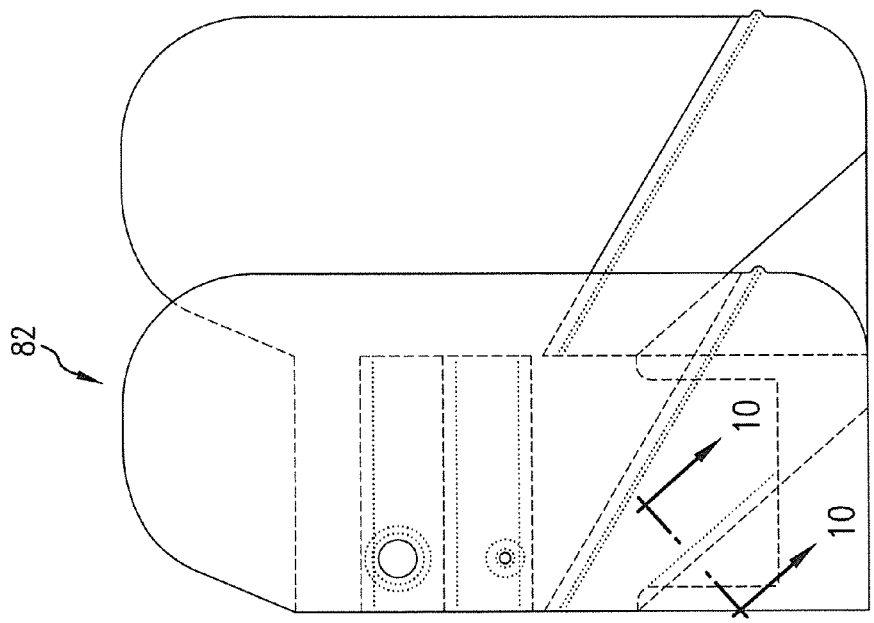
FIG. 9 is a top view showing the sewing together of a layer of the folded valve with the internal tether of an airbag cushion in accordance with one embodiment of the invention.

The folded precursor 82 can be manipulated, as shown in FIG. 9 and FIG. 10 to facilitate the sewing together of a layer 56 of the folded valve with the internal tether 38. Similarly, the layer 54 of the folded valve can be sewn with the internal tether 36 (not specifically shown).

Figure 12:
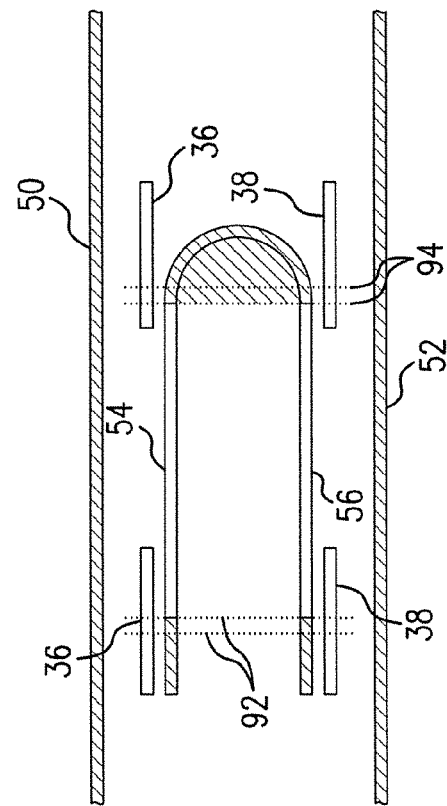
FIG. 12 is a fragmentary cross sectional view, taken along the line 12-12 shown in FIG. 11, showing the sewing together of a layer of the folded valve with the internal tether of an airbag cushion in accordance with one embodiment of the invention.
Figure 11:
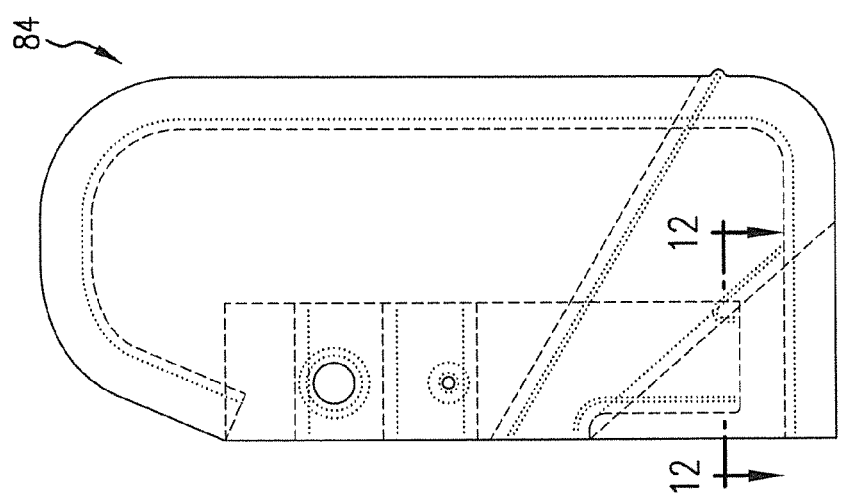
FIG. 11 is a top view showing the further sewing together of the folded valve with the internal tether of an airbag cushion in accordance with one embodiment of the invention.

FIGS. 11 and 12 illustrate a precursor the airbag cushion 20, here airbag cushion precursor designated by the reference numeral 84, such as formed or produced by taking the folded precursor with the first and second internal tethers joined therewith, such as described above, and now with the valve layer 54 further appropriately joined or connected to or with the tether 36 and the valve layer 56 further appropriately joined or connected to or with the tether 38 such as via seams 92 and 94, for example.

Figure 13:
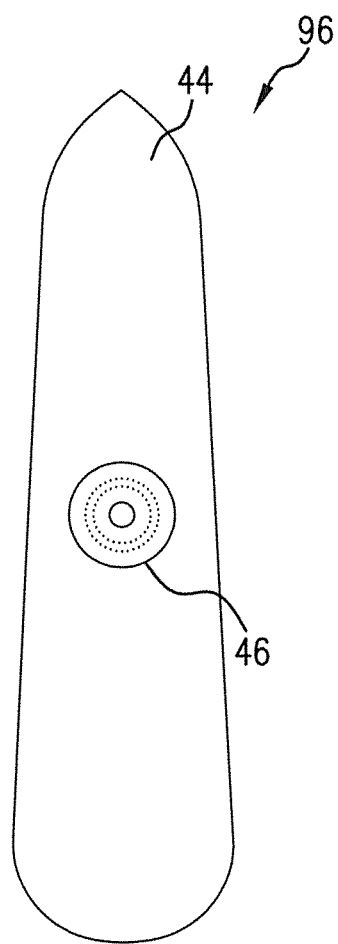
FIG. 13 is a top view showing an assembled front panel for an airbag cushion in accordance with one embodiment of the invention.

FIG. 13 illustrates an assembled front panel, designated by the reference numeral 96 and such as generally composed of the front panel section 44 with the front panel vent reinforcement patch 46 sewn or otherwise appropriately joined or connected therewith.

Figure 15:
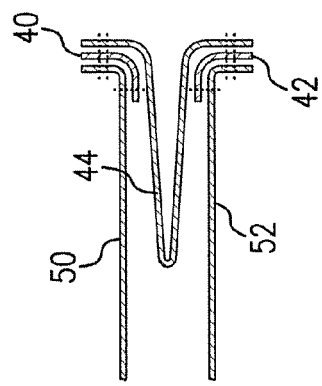
FIG. 15 is a fragmentary cross sectional view, taken along the line 15-15 shown in FIG. 1.
Figure 14:
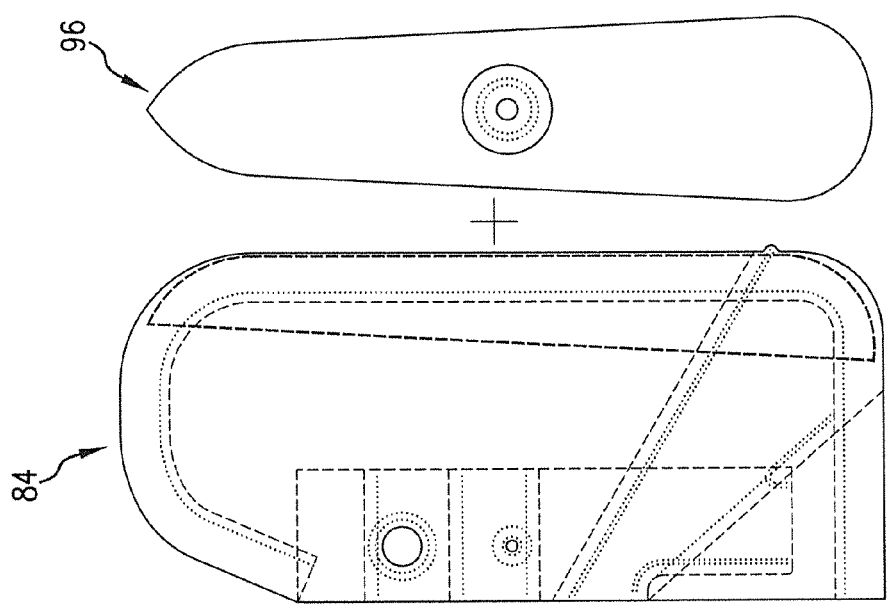
FIG. 14 depicts the addition of an assembled front panel 96 to a folded airbag cushion precursor in accordance with one aspect of the invention.
Figure 16:
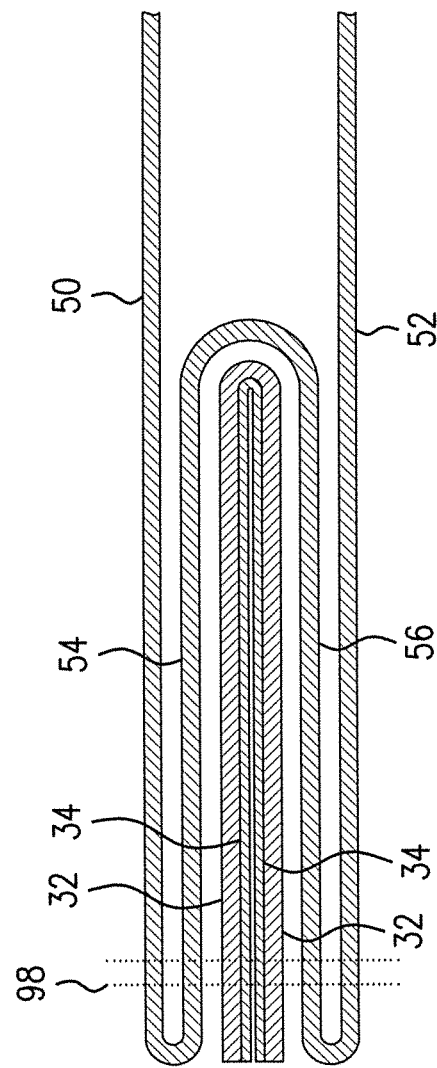
FIG. 16 is a fragmentary cross sectional view, taken along the line 16-16 shown in FIG. 1.

FIGS. 14 and 15 depict the assembled front panel 96 sewn or otherwise appropriately joined or connected to the folded precursor 84. Such processing with the further processing or addition of a peripheral sew seam, such as shown as item 98 in FIG. 1, see FIG. 16, results in the airbag cushion 20 shown in FIG. 1.

Figure 18:
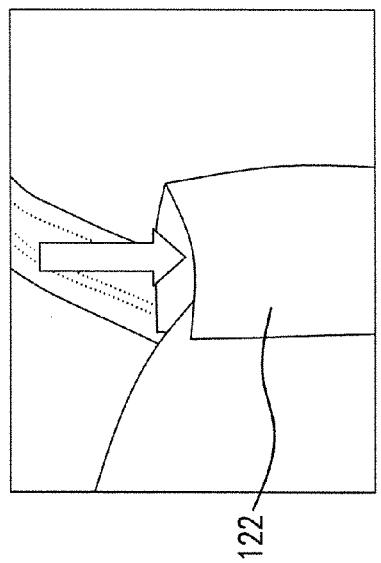
FIG. 18 is a simplified fragmentary view showing an inflator insertion opening in an inner valve feature in accordance with one aspect of the invention.
Figure 19:
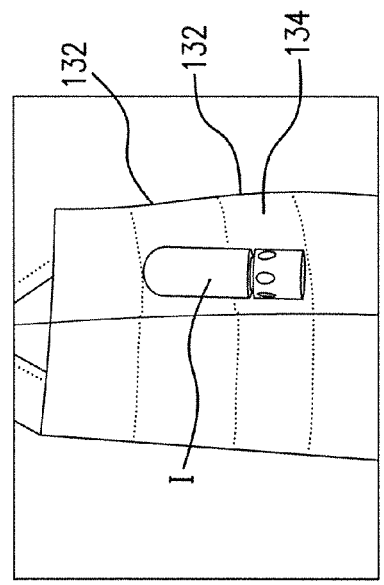
FIG. 19 is a simplified fragmentary view showing an inflator disposed within an airbag cushion in accordance with one aspect of the invention.
Figure 17:
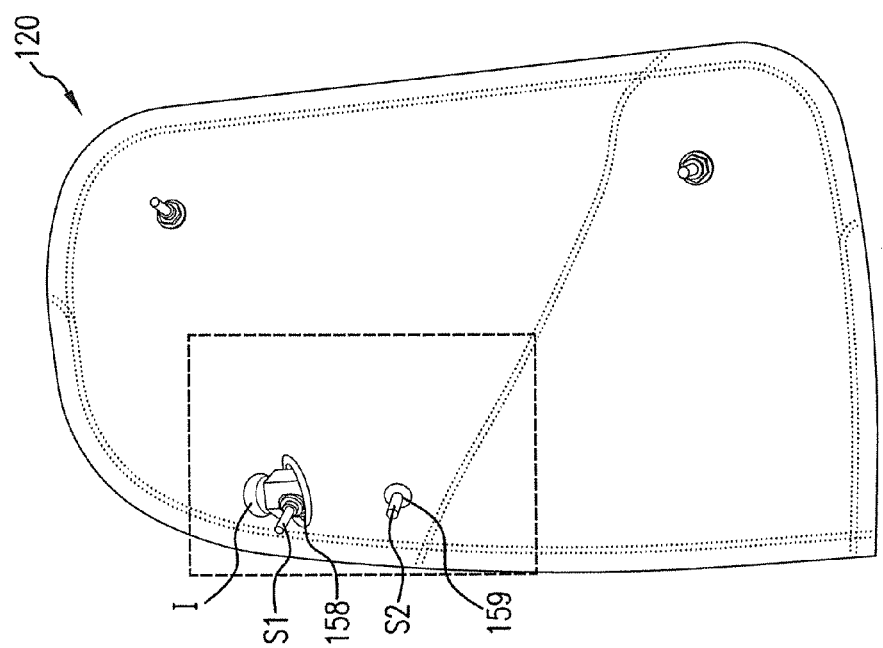
FIG. 17 is a simplified plan view showing the insertion of an inflator device into an airbag cushion in accordance with one aspect of the invention.

A more complete or fuller understanding of the invention may be realized by reference to FIGS. 17-19 which more specifically further illustrate selected features of airbag cushions in accordance with specific aspects of the invention.

There is shown an airbag cushion, generally designated by the reference numeral 120, in accordance with one aspect of the invention. The airbag cushion 120 is generally similar to the airbag cushion 20 described above.

As shown in FIG. 17 and FIG. 18, in the airbag cushion 120, the airbag cushion opening 158 is appropriately sized, e.g., is sufficiently large, to permit the insertion of a desired inflator device I, into the interior of the inner valve 122. Thus, the airbag cushion opening 158 can in accordance with one aspect of the invention be sized sufficiently large so as to permit the easy installation of an inflator device therethrough after the airbag cushion has been assembled. Further, the inflator device I includes a first and a second mounting or assembly stud S1 and S2, respectively, such as positioned to be disposed through the airbag cushion openings 158 and 159 so as to be used in attachment or fastening of the inflator device and airbag cushion assembly such as within a motor vehicle, for example.

As perhaps best seen by reference to FIG. 19, with the inflator device I in place within the airbag cushion 120, the single heat shield layer composed of the heat shield material 132 and the double heat shield layer composed of both the heat shield material 132 and the heat shield material 134 are disposed adjacent the inflator device I to provide desired heat shielding to the balance of the airbag cushion and assembly.

Those skilled in the art and guided by the teachings herein provided will understand and appreciate that an airbag cushion construction such as herein described can desirably facilitate manufacture and assembly such as by combining forming of the inner valve with the forming of the main airbag cushion body and/or combining sewing or other fastening of the inner valve and the main airbag cushion body.

Thus, in accordance with one aspect of the invention, there is provided an airbag cushion that advantageously improves airbag cushion fabric utilization.

In accordance with another aspect of the invention, there is provided an airbag cushion that can advantageously either or both simplify or improve manufacture processing.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An airbag cushion comprising:
a main airbag cushion panel wherein a cushion fabric cut layout includes first and second major body fabric portions together in a continuous form with first and second inner valve fabric portions extending therebetween, the first and second inner valve fabric portions foldable to form an inner valve for at least in part containing an inflation gas supplying inflator device, the first and second major body fabric portions joinable together at a peripheral joint portion to at least in part form an airbag cushion body, the airbag cushion body having an interior to receive inflation gas, the airbag cushion body deployable on a side of an occupant seated in a vehicle seat.

2. The airbag cushion of claim 1 wherein the main airbag cushion panel at least in part forms a side airbag cushion.

3. The airbag cushion of claim 1 wherein the inner valve forms a sleeve to extend about the inflator device, the sleeve having oppositely disposed open ends to permit the inflation gas passage out of the inner valve and into the interior of the airbag cushion body.

4. The airbag cushion of claim 3 wherein the sleeve additionally comprises heat shield reinforcement adjacent the inflator device.

5. The airbag cushion of claim 4 wherein the heat shield reinforcement comprises at least one added layers of airbag cushion fabric.

6. The airbag cushion of claim 3 wherein the sleeve additionally comprises a side opening to permit insertion of the inflator device into the sleeve.

7. The airbag cushion of claim 6 wherein the sleeve additionally comprises at least one attachment opening longitudinally spaced apart from the side opening, the at least one attachment opening permitting an attachment stud extending from the inflator device to pass therethrough for attachment to a vehicle.

8. A side airbag cushion comprising:
a main airbag cushion panel wherein a cushion fabric cut layout includes first and second major body fabric portions together in a continuous form with first and second inner valve fabric portions extending therebetween, the first and second inner valve fabric portions foldable to form an inner valve for at least in part containing an inflation gas supplying inflator device, the first and second major body fabric portions joinable together at a peripheral joint portion to at least in part form an airbag cushion body, the airbag cushion body having an interior to receive inflation gas, wherein the inner valve at least in part guides the inflation gas into the airbag cushion body interior and wherein the airbag cushion body deployable on a side of an occupant seated in a vehicle seat.

9. The side airbag cushion of claim 8 wherein the inner valve forms a sleeve to extend about the inflator device and wherein the sleeve additionally comprises heat shield reinforcement adjacent the inflator device.

10. The airbag cushion of claim 9 wherein the heat shield reinforcement comprises at least one added layers of airbag cushion fabric.

11. The airbag cushion of claim 9 wherein the sleeve additionally comprises a side opening to permit insertion of the inflator device into the sleeve.

12. The airbag cushion of claim 11 wherein the sleeve additionally comprises at least one attachment opening longitudinally spaced apart from the side opening, the at least one attachment opening permitting an attachment stud extending from the inflator device to pass therethrough for attachment to a vehicle.

13. A method of manufacturing an airbag cushion, the method comprising:
  cutting a sheet of airbag cushion fabric to form a main airbag cushion panel wherein a cushion fabric cut layout includes first and second major body fabric portions together in a continuous form with first and second inner valve fabric portions extending therebetween, and
  folding the first and second inner valve fabric portions to form an inner valve for at least in part containing an inflation gas supplying inflator device, the first and second major body fabric portions joinable together at a peripheral joint portion to at least in part form an airbag cushion body, the airbag cushion body having an interior to receive inflation gas, the airbag cushion body deployable on a side of an occupant seated in a vehicle seat.

14. The method of claim 13 wherein the main airbag cushion panel at least in part forms a side airbag cushion.

15. The method of claim 13 wherein said cutting step additionally forms at least one heat shield reinforcement portion and said method additionally comprises:
  joining said at least one heat shield reinforcement portion to the first and second inner valve fabric portions wherein upon folding of the first and second inner valve fabric portions to form the inner valve the at least one heat shield reinforcement portion is to be adjacent the inflation gas supplying inflator device to be disposed within the inner valve.

16. The method of claim 13 wherein said cutting step forms at least first and second heat shield reinforcement portions and said method additionally comprises:
  disposing the first heat shield reinforcement portion adjacent the first and second inner valve fabric portions,
  at least in part overlying the first heat shield reinforcement portion with the second heat shield reinforcement portion, and
  joining the first heat shield reinforcement portion and the at least in part overlying second heat shield reinforcement section to the first and second inner valve fabric portions wherein upon folding of the first and second inner valve fabric portions to form the inner valve the heat shield reinforcement portions are adjacent the inflation gas supplying inflator device to be disposed within the inner valve.

17. The method of claim 13 wherein the folding the first and second inner valve fabric portions to form an inner valve comprises:
  folding the main airbag cushion panel along a longitudinal line dividing the first and second inner valve fabric portions to form a precursor to the inner valve, and
  joining the first and second inner valve fabric portions together to form the inner valve, and said method additionally comprises:
  joining the first and second major body fabric portions together at a peripheral joint portion to at least in part form the airbag cushion body.

18. The method of claim 17 wherein prior to the joining together of the first and second major body fabric portions the method additionally comprises:
  joining a first tether to a first of the first and second major body fabric portions.

19. The method of claim 18 wherein prior to the joining together of the first and second major body fabric portions the method additionally comprises:
  joining a second tether to a second of the first and second major body fabric portions.

* * * * *